United States Patent [19]
Singh

[11] Patent Number: 5,336,350
[45] Date of Patent: Aug. 9, 1994

[54] PROCESS FOR MAKING COMPOSITE CONTAINING FIBROUS MATERIAL

[75] Inventor: Raj N. Singh, Schenectady, N.Y.

[73] Assignee: General Electric Company, Schenectady, N.Y.

[21] Appl. No.: 429,430

[22] Filed: Oct. 31, 1989

[51] Int. Cl.⁵ .............................................. B32B 31/00
[52] U.S. Cl. ..................... 156/155; 156/246; 156/280; 156/313; 156/319; 428/688; 428/704
[58] Field of Search ............... 156/155, 313, 246, 319, 156/280; 428/688, 704

[56] References Cited

U.S. PATENT DOCUMENTS

| | | |
|---|---|---|
| 4,026,746 | 5/1977 | Straw .................................. 156/155 |
| 4,353,714 | 10/1982 | Lee et al. ............................. 51/295 |
| 4,737,328 | 4/1988 | Morelock ............................. 264/62 |
| 4,752,503 | 6/1988 | Thebault ........................... 427/248.1 |
| 4,793,859 | 12/1988 | Morelock ............................. 75/245 |

Primary Examiner—John J. Gallagher
Attorney, Agent, or Firm—James Magee, Jr.; James C. Davis, Jr.

[57] ABSTRACT

A composite is produced by forming tapes comprised of a mixture of infiltration-promoting material and organic binding material, disposing a layer of boron nitride coated fibrous material between at least two of the tapes forming a layered structure, laminating the layered structure, heating the layered structure to remove organic binding material and infiltrating the resulting porous body with a solution of boron and silicon.

34 Claims, 1 Drawing Sheet

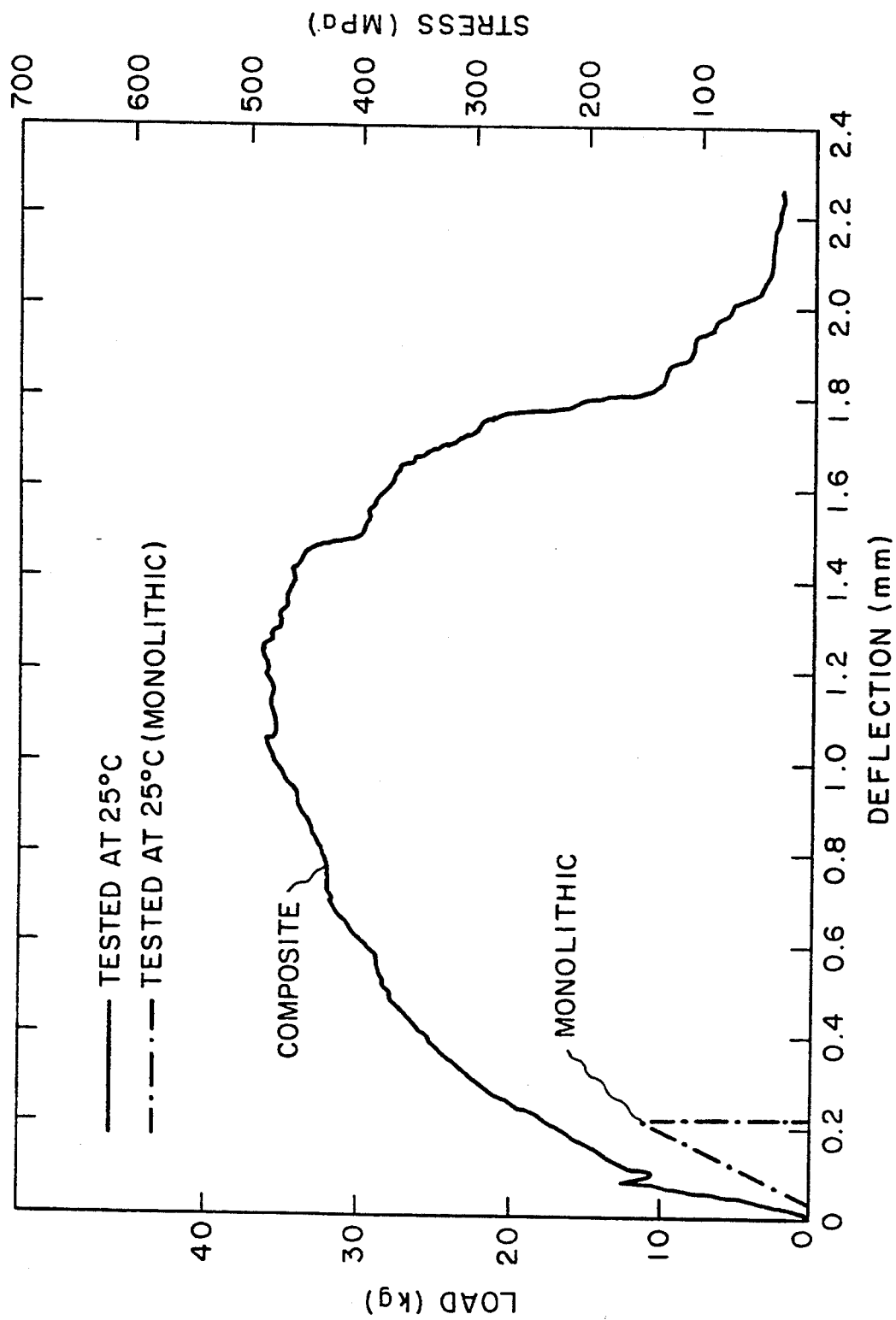

PROCESS FOR MAKING COMPOSITE CONTAINING FIBROUS MATERIAL

This application is related to Ser. No. 056,516, filed Jun. 1, 1987 for Borom et al.; and Ser. No. 100,806, filed Sept. 24, 1987; Ser. No. 216,488, filed Jul. 8, 1988 (now U.S. Pat. No. 4,944,904); Ser. No. 216,471, filed Jul. 8, 1988; U.S. Pat. No. 4,931,311 filed Dec. 21, 1987; Ser. No. 132,753, filed Dec. 14, 1987 now U.S. Pat. No. 4,886,682; U.S. Pat. No. 4,886,682; Ser. No. 290,552, filed Dec. 27, 1988; Ser. No. 262,651, filed Oct. 21, 1988 (now U.S. Pat. No. 4,915,760); Ser. No. 260,201, filed Oct. 20, 1988; all for Singh et al. The referenced applications are directed to the production of fiber containing ceramic composites. They are assigned to the assignee hereof.

U.S. Pat. Nos. 4,120,731; 4,141,948; 4,148,894; 4,220,455; 4,238,433; 4,240,835; 4,242,106; 4,247,304, 4,353,953, 4,626,516, and 4,737,328; assigned to the assignee hereof and incorporated herein by reference, disclose silicon infiltration of materials which include carbon, molybdenum, carbon-coated diamond and/or cubic boron nitride, and blends of carbon with silicon carbide, boron nitride, silicon nitride, aluminum oxide, magnesium oxide, and zirconium oxide.

This invention relates to the production of a composite containing boron nitride-coated fibrous material in a matrix containing a phase of a solution of boron and elemental silicon.

Fiber reinforcement of brittle ceramic materials offers significant opportunities for toughening of the brittle matrix. Many efforts have been extended to produce fiber reinforced, high temperature materials. Structures of carbon fiber reinforced carbon matrices have been used in high temperature structural applications but they have the disadvantage of poor to no oxidation resistance (i.e. they burn). High strength carbon fibers were infiltrated with molten silicon with the hope that the silicon matrix would protect the carbon filaments. However, the carbon filaments converted instead into relatively weak, irregular columns of SiC crystals resulting in composites with low toughness and relatively modest strength.

As an alternative approach, attempts have been made to incorporate SiC type fibrous material in a silicon matrix by the process of silicon infiltration. There are a number of problems when silicon carbide fibrous material is infiltrated with silicon. Even though SiC has limited solubility in molten silicon, this solubility leads to transport and recrystallization of SiC thereby causing the SiC fibers to lose strength. Also, silicon carbide forms a strong bond with silicon which results in brittle fracture of the composite.

The present invention utilizes a solution of boron and elemental silicon to infiltrate a porous body comprised of boron nitride coated fibrous material and infiltration-promoting material to produce a composite in which the fibrous material has not been affected, or has not been significantly deleteriously affected, by processing conditions.

In one embodiment, since boron nitride is not wettable by silicon, a coating of a silicon-wettable material is deposited on the boron nitride coating.

In another embodiment, boron nitride coated filaments of a sufficiently large diameter are used which do not require a silicon-wettable coating. Generally, these filaments or boron nitride coated filaments have a diameter of at least about 50 microns and a minimum length of at least about 10 times their diameter.

The present invention permits control of the structure of the final composite. It enables production of any desired spacing and alignment within a layer and between layers of coated fibrous material in the matrix.

Those skilled in the art will gain a further and better understanding of the present invention from the detailed description set forth below, considered in conjunction with the accompanying FIGURE which forms a part of the specification, which shows a graph illustrating the load-deflection behavior of one embodiment of the present composite comprised of spaced boron nitride coated filaments in a matrix, and another graph illustrating the load-deflection behavior of a monolithic body.

Briefly stated, one embodiment of the present process for producing a composite containing at least about 10% by volume of boron nitride coated fibrous material and having a porosity of less than about 20% by volume comprises the following steps:

(a) forming tapes comprised of a mixture of infiltration-promoting material and organic binding material;

(b) depositing a coating of boron nitride on fibrous material leaving no significant portion thereof exposed;

(c) depositing a silicon-wettable coating on said boron nitride-coated fibrous material leaving no significant portion of said boron nitride exposed;

(d) disposing a layer of the resulting coated fibrous material between the faces of two of said tapes forming a layered structure;

(e) laminating the layered structure to form a laminated structure;

(f) heating said laminated structure to remove said organic binding material leaving no significant deleterious residue producing a porous body;

(g) infiltrating a molten infiltrant comprised of boron and silicon into said porous body producing an infiltrated product, said infiltrant containing boron in solution in an amount ranging from about 0.1% by weight of silicon to an amount which forms a saturated solution with silicon; and (h) cooling said infiltrated product producing said composite.

As used herein, the word tape includes sheet.

As used herein, "fibrous material" includes fibers chopped fibers, filaments, continuous filaments, strands, bundles, whiskers, cloth, felt and any combinations thereof. The fibrous material can be amorphous, crystalline or a mixture thereof. The crystalline fibrous material can be single crystal or polycrystalline.

In one embodiment, the fibrous material is selected from the group consisting of aluminum oxide, mullite, a carbon-containing material, elemental carbon, a SiC-containing material, silicon carbide, a silicon nitride-containing material, silicon nitride, silica, and mixtures thereof.

The carbon-containing material preferably contains carbon in an amount of at least about 1% by weight, frequently at least about 5% by weight, of the fibrous material. The present carbon-containing material includes materials such as, for example, carbides.

As used herein, "elemental carbon" includes all forms of elemental carbon including graphite.

Reference herein to a fibrous material of silicon carbide, includes, among others, presently available materials wherein silicon carbide envelops a core or substrate, and which generally are produced by chemical vapor deposition of silicon carbide on a core or substrate such for example, elemental carbon or tungsten.

The SiC-containing fibrous material generally contains at least about 50% by weight of silicon and at least about 25% by weight of carbon, based on the weight of the SiC-containing fibrous material. Examples of SiC-containing materials are silicon carbide, Si-C-O, Si-C-O-N, Si-C-O-Metal, Si-C-O-N-Metal, and mixtures thereof, where the Metal component can vary but frequently is Ti or Zr and wherein O, N and Metal are present generally in an amount of at least about 1% by weight of the fibrous material.

The silicon nitride-containing fibrous material generally contains at least about 50% by weight of silicon and at least about 25% by weight of nitrogen based on the weight of the silicon nitride-containing fibrous material and is selected from the group consisting of Si-N-O, Si-C-O-N, Si-N-O-Metal, Si-C-O-N-Metal, and mixtures thereof, wherein said O, C, and Metal are each present in an amount of at least about 1% by weight of the fibrous material.

There are processes known in the art which use organic precursors to produce SiC- and silicon nitride-containing fibrous materials which may introduce a wide variety of elements into the fibrous material.

The fibrous material is a solid and stable at the temperature of the present process. Preferably, the fibrous material has in air at ambient or room temperature, i.e. from about 15° C. to about 30° C., a minimum tensile strength of about 100,000 psi and an minimum tensile modulus of about 25 million psi.

In carrying out the present process, boron nitride is coated on the fibrous material to produce a coating thereon which leaves no significant portion, and preferably none, of the fibrous material exposed. The boron nitride coating should be continuous, and preferably it is of uniform or at least significantly uniform thickness.

The boron nitride coating can be deposited on the fibrous material by a number of known techniques under conditions which have no significant deleterious effect on the fibrous material. Generally, the boron nitride coating can be deposited by chemical vapor deposition by reactions such as:

$$B_3N_3H_6(g) \rightarrow 3BN(s) + 3H_2(g)$$

$$B_3N_3H_3Cl_3(g) \rightarrow 3BN(s) + 3HCl(g)$$

$$BCl_3(g) + NH_3(g) \rightarrow BN(s) + 3HCl(g)$$

Generally, the chemical vapor deposition of boron nitride is carried out at temperatures ranging from about 900° C. to 1800° C. in a partial vacuum, with the particular processing conditions being known in the art or determinable empirically.

The boron nitride coating should be at least sufficiently thick to be continuous. Generally, the coating is sufficiently thin so that the thermal expansion coefficient of the boron nitride coated fibrous material is the same as, or not significantly different from, that of the uncoated fibrous material. Generally, the thickness of the coating ranges from about 0.3 microns to about 5 microns, and typically it is about 0.5 microns. The particular thickness of the coating is determinable empirically, i.e. it should be sufficient to prevent reaction, or prevent significant reaction, between the fibrous material and the infiltrating infiltrant under the particular processing conditions used. The boron nitride coating should leave none or no significant portion of the fibrous material exposed. In the present invention, the boron nitride coating bars contact, or bars significant contact, between the fibrous material and the infiltrating infiltrant. When a saturated solution of boron and silicon is used as an infiltrant, the boron nitride coating will not react with or dissolve in the molten infiltrant. However, when an unsaturated solution of boron and silicon is used as infiltrant, the boron nitride coating may or may not react with or dissolve in the molten infiltrant and this is determinable empirically depending largely on time, temperature and concentration of boron in solution. For example, for a given unsaturated solution, the boron nitride coating will survive better at lower temperatures and/or shorter times. Generally, infiltration time increases with the size of the porous body. Larger-sized porous bodies, therefore, may require thicker boron nitride coatings when the infiltrant is an unsaturated solution. However, for a given infiltration time and temperature, as the concentration of boron in solution is increased, the tendency of the boron nitride coating to react with or dissolve in the molten infiltrant usually decreases.

A number of techniques can be used to determine if the boron nitride coating survived. For example, if the composite exhibits fiber pull-out on fracture, then the boron nitride coating has survived. Also, scanning electron microscopy of a cross-section of the present composite can detect a boron nitride coating on the fibrous material.

In one embodiment, a coating of a silicon-wettable material is deposited on the boron nitride coating substantially covering it. Preferably, the silicon-wettable coating leaves no significant portion or none of the boron nitride coating exposed. Also, preferably, the silicon-wettable coating is of uniform or at least significantly uniform thickness. Generally, the thickness of the silicon-wettable coating ranges from about 500 Angstroms to about 3 microns, and typically it is about 0.5 microns. Its particular thickness is determined empirically and depends largely on its rate of consumption, if any, and the particular composite desired.

The silicon-wettable coating is a solid in the present process. Its particular composition depends largely on the particular composite desired and is determined empirically. It should be sufficiently wetted by the infiltrating infiltrant to enable production of the present composite. Preferably, the infiltrant has a contact or wetting angle against the silicon-wettable material of less than 90 degrees to allow the infiltration to occur by capillarity. The silicon-wettable coating should have no significant deleterious effect herein.

Representative of useful silicon-wettable materials are elemental carbon, metal carbide, a metal which reacts with silicon to form a silicide, a metal nitride such as silicon nitride, and a metal silicide. Elemental carbon is preferred and usually, it is deposited on the boron nitride-coated material in the form of pyrolytic carbon. Generally, the metal carbide is a carbide of silicon, tantalum, titanium or tungsten. Generally, the metal silicide is a silicide of chromium, molybdenum, tantalum, titanium, tungsten and zirconium.

The metal which reacts with silicon to form a silicide thereof as well as the silicide must have melting points higher than the melting point of silicon and preferably higher than about 1450° C. Representative of such metals is chromium, molybdenum, tantalum, titanium, tungsten and zirconium.

Known techniques can be used to deposit the coating of silicon-wettable material which generally is deposited by chemical vapor deposition using low pressure techniques.

The metal carbide or metal silicide coating can be directly deposited from the vapor thereof. Alternatively, the metal carbide coating can be formed in situ by initially depositing carbon followed by deposition of metal thereon under conditions which form the metal carbide. If desired, metal silicide coating can be produced by initially depositing the metal followed by deposition of silicon under conditions which form the metal silicide.

The infiltration-promoting material is also a silicon-wettable material which is sufficiently wetted by the infiltrating infiltrant to enable the production of the present composite. Preferably, the infiltrating infiltrant has a contact or wetting angle against the infiltration-promoting material of less than 90 degrees to allow the infiltration to occur by capillarity. The infiltration-promoting material should have no significant deleterious effect in the present process or on the resulting composite. The particular composition of the infiltration-promoting material is determined empirically and depends largely on the particular composite desired, i.e. the particular properties desired in the composite.

Representative of useful infiltration-promoting materials are elemental carbon, a metal carbide, a metal which reacts with silicon to form a silicide, a metal nitride, a metal silicide and mixtures thereof.

Elemental carbon is a preferred infiltration-promoting material. In one embodiment, elemental carbon comprises from about 5% to about 100%, or from about 10% to about 50%, by weight of the infiltration-promoting material.

Representative of a useful infiltration promoting metal carbide is boron carbide, molybdenum carbide, niobium carbide, silicon carbide, titanium carbide and mixtures thereof. Silicon carbide is preferred.

In a preferred embodiment, the infiltration-promoting material is comprised of a mixture of fibrous material of elemental carbon, preferably as crushed carbon felt, and silicon carbide powder, wherein the powder ranges from about 10% to about 50% by weight of the mixture.

Representative of the infiltration-promoting metal nitrides are aluminum nitride, niobium nitride, silicon nitride, titanium nitride, zirconium nitride and mixtures thereof.

Representative of a metal which reacts with silicon to form a silicide is chromium, molybdenum, tantalum, titanium, tungsten, zirconium and mixtures thereof. Likewise, representative of infiltration-promoting metal silicides is chromium silicide, molybdenum silicide, tantalum silicide, titanium silicide, tungsten silicide, zirconium silicide and mixtures thereof. The metal which reacts with silicon to form a silicide thereof as well as the silicide must have melting points higher than the melting point of the infiltrant and preferably higher than about 1450° C.

Generally, the infiltration-promoting material is a solid in the present process. However, in one embodiment, elemental silicon forms a part of the infiltration-promoting material and ranges up to about 30%, preferably from about 1% to about 10%, by volume of the infiltration-promoting material. Elemental silicon, as a part of the infiltration-promoting material, is molten when the infiltrant is infiltrated into the porous structure and promotes its infiltration.

The infiltration-promoting material can be in the form of a powder, a fibrous material and mixtures thereof. When the infiltration-promoting material is in the form of particles, generally the particles have a specific surface area ranging from about 0.2 to about 10 meters$^2$ per gram, and frequently, ranging from about 2 to about 4 meters$^2$ per gram. When the infiltration-promoting material is in the form of a fibrous material, it generally is in the form of whiskers, chopped fibers and mixtures thereof. Generally, the whiskers are less than about 50 microns in length and less than about 10 microns in diameter. Preferably, the whiskers are crystalline and are comprised of silicon carbide, silicon nitride and mixtures thereof. Generally, the chopped fibers are less than about 50 microns in length and less than about 10 microns in width. Preferably, the chopped fibers are comprised of graphite. In a preferred embodiment, the infiltration promoting material is comprised of a mixture of particles and fibrous material wherein the fibrous material, preferably whiskers, ranges from about 1% to about 50%, or from about 10% to about 40%, by weight of the mixture. The amount and type of infiltration-promoting material depends largely on the particular composite desired and is determined empirically.

The organic binding material used in the present process bonds the infiltration-promoting material together to form a tape or sheet of desired thickness and solids content. By solids content, it is meant herein the content of infiltration-promoting material. The organic binding material, i.e. that component of the tape other than its solids content, thermally decomposes at an elevated temperature ranging to below about 800° C., generally from about 50° C. to below about 800° C., and preferably from about 100° C. to about 500° C., to gaseous product of decomposition which vaporizes away leaving no significant deleterious residue.

The organic binding material is a thermoplastic material with a composition which can vary widely and which is well known in the art or can be determined empirically. Besides an organic polymeric binder it can include an organic plasticizer therefor to impart flexibility. The amount of plasticizer can vary widely depending largely on the particular binder used and the flexibility desired, but typically, it ranges up to about 50% by weight of the total organic content. Preferably the organic binding material is soluble in a volatile solvent.

Representative of useful organic binders are polyvinyl acetates, polyamides, polyvinyl acrylates, polymethacrylates, polyvinyl alcohols, pclyvinyl butyrals, and polystyrenes. The useful molecular weight of the binder is known in the art or can be determined empirically. Ordinarily, the organic binder has an average molecular weight at least sufficient to make it retain its shape at room temperature and generally such an average molecular weight ranges from about 20,000 to about 200,000, frequently from about 30,000 to about 100,000.

Representative of useful plasticizers are dioctyl phthalate, dibutyl phthalate, diisodecyl glutarate, polyethylene glycol and glycerol trioleate.

In carrying out the present process, the infiltration-promoting material and organic binding material are admixed to form preferably a uniform or at least a substantially uniform mixture or slurry which is formed into a tape of desired thickness and solids content. A number of conventional techniques can be used to form the mixture and resulting green tape or sheet. Generally, the infiltration-promoting material is in a form useful for forming a slurry therewith for forming the desired tape. Generally, the components are milled in an organic solvent in which the organic material is soluble or at least partially soluble to produce a castable mixture or suspension. Examples of suitable solvents are methyl ethyl ketone, toluene and alcohol. The castable mixture or slurry is then cast into a tape of desired thickness in a conventional manner, usually by doctor blading which is a controlled spreading of the mixture or slurry on a carrier from which it can be easily released such as Teflon. The cast tape is dried to evaporate the solvent therefrom to produce the present tape or sheet which is then removed from the carrier.

The particular amount of organic binding material used in forming the mixture is determinable empirically and depends largely on the amount and distribution of solids desired in the resulting tape. Generally, the organic binding material ranges from about 25% to about 80% by volume, frequently from about 25% to about 50% by volume, of the solids content of the tape.

The present tape or sheet can be as long and as wide as desired, and generally it is of uniform or substantially uniform thickness. Its thickness depends largely on the volume fraction of coated fibrous material which must be accommodated and the particular composite desired and is determinable empirically. The tapes should be at least sufficiently thick to contain an amount of infiltration-promoting material which produces the present composite. Generally, with increasing volume fractions of the layer or layers of fibrous material, correspondingly smaller amounts of infiltration-promoting material would be required. Generally, the tape has a thickness ranging from about 25 microns (0.001 inch) to about 1300 microns (0.052 inch), frequently ranging from about 125 microns (0.005 inch) to about 1000 microns (0.040 inch), and more frequently ranging from about 250 microns (0.01 inch) to about 500 microns (0.02 inch).

Generally, in carrying out the present process, a layer of the coated fibrous material is placed between, i.e. intermediate, two tapes, i.e. between the faces of the tapes, to form a layered structure, preferably substantially a sandwich structure. The layer of coated fibrous material can be continuous or discontinuous and it contains sufficient spacing to permit production of the present composite. Preferably, there is sufficient spacing in the layer between the fibers, filaments, strands, bundles, or whiskers to enable the tapes to flow therebetween sufficiently during lamination of the layered structure to produce the present composite. The extent of spacing in the layer of coated fibrous material is determined empirically and depends largely on the size of the infiltration-promoting material and the particular composite desired. A sufficient amount of the infiltration-promoting material is of a size, and preferably it is comprised of a size, which can penetrate the spaces in the layer of coated fibrous material sufficiently to produce the present composite.

A plurality of layers of coated fibrous material can be used in forming the layered structure provided they are separated from each other by a tape. The number of tapes and layers of fibrous material used can vary widely depending largely on the particular composite desired. Preferably, the tapes in the layered structure are at least substantially coextensive with each other, i.e. substantially a sandwich-type structure. The amount of fibrous material is determined empirically and should be sufficient to produce the final composite containing at least about 10% by volume of boron nitride coated fibrous material or boron nitride fibrous material.

In one embodiment of the present process, no silicon-wettable coating is used for a layer of fibrous material comprised of a plurality of continuous boron nitride coated filaments having a diameter of at least about 50 microns, preferably with a diameter ranging from about 50 microns to about 250 microns, frequently from about 70 microns to about 200 microns, or from about 100 microns to about 150 microns. These boron nitride coated filaments can be as long as desired and generally have a minimum length of at least about 10 times their diameter, and in one embodiment are longer than about 1000 microns or longer than about 2000 microns. The minimum diameter of the boron nitride coated filaments depends largely on the minimum spacing required therebetween through which the tapes must flow or penetrate and is determined empirically. For a given volume fraction of filaments, as the diameter of the filaments decreases, the total amount of space decreases making it more difficult for the infiltration-promoting material to penetrate the space.

Preferably, in one embodiment, a preform is used comprised of a layer of a plurality of continuous boron nitride coated filaments which are spaced from each other and which are parallel, or at least substantially parallel, to each other. The minimum space between the coated filaments is at least sufficient to enable the tapes to flow therebetween, and generally, it is at least about 50 microns, and frequently at least about 100 microns. Generally, the spacing between the coated filaments in a single layer is substantially equivalent, or if desired, it can vary. Filament loading in the composite can be varied by changing the spacing between the coated filaments and/or tape thickness. In a preferred embodiment, the filaments are comprised of silicon carbide or elemental carbon and whiskers of silicon carbide comprise from about 1% to about 40% by weight of the infiltration-promoting material. The present invention enables the production of a final composite with a high volume fraction of a plurality of uniaxially aligned continuous filaments.

The preform of coated filaments can be produced by a number of conventional techniques. For example, the coated filaments can be uniaxially aligned and spaced by placing them in a suitable device provided with grooves and the desired spacing. The layer of coated filaments can be lifted off the device with adhesive tape placed across both ends of the filaments. The taped end portions of the coated filaments can eventually be cut away from the laminated structure.

In one embodiment before assembly of the layered structure, a solution of the present organic binder in organic solvent is deposited, generally sprayed, on the faces of the tapes to be contacted with the layer of coated fibrous material, dried to evaporate the solvent and leave a sticky film of organic binder to enhance adhesion. The concentration of organic binder in solution can vary widely and generally ranges from about 1% by weight to about 10% by weight of the solution. The solution is sprayed on the face of the tape for a period of time, determinable empirically, so that on evaporation of the solvent sufficient sticky binder remains to significantly enhance adhesion or facilitate bonding of the tapes. Preferably, drying is carried out in air at ambient temperature in less than a minute, and typically, in a few seconds. The deposited binder can be a continuous or a discontinuous coating, and typically, 0.2 milligrams of sticky binder per square centimeter of surface is adequate.

The layered structure is then laminated under a pressure and temperature determined empirically depending largely on the particular composition of the organic binding material to form a laminated structure. Lamination can be carried out in a conventional manner. Preferably, laminating temperature is below the temperature at which there is decomposition, or significant decomposition, of organic binding material and generally, an elevated temperature below 250° C. is useful and there is no significant advantage in using higher temperatures. Typically, the lamination temperature ranges from about 35° C. to about 200° C. and the pressure ranges from about 500 psi to about 3000 psi. Generally, lamination time ranges from about ½ to about 5 minutes. Also, generally, lamination is carried out in air.

If desired, the laminated structure can be cut to desired dimensions by suitable means such as a diamond saw. Frequently, the laminated structure is flexible and can be bent to form a desired shape depending largely on fiber diameter and thickness of the laminated structure and may require some heat to impart flexibility thereto.

The laminated structure is heated to thermally decompose the organic binding material therein producing a porous body comprised of the coated fibrous material and infiltration-promoting material. The rate of heating depends largely on the thickness of the sample and on furnace characteristics. At a firing temperature ranging up to about 500° C., a slower heating rate is desirable because of the larger amounts of gas generated at these temperatures by the decomposition of the organic binding material. Typically, the heating rate for a sample of less than about 6 millimeters (6000 microns) in thickness can range from about 15° C. per hour to about 30° C. per hour. At a temperature of less than about 800° C., thermal decomposition is completed leaving no significant deleterious residue.

Thermal decomposition can be carried out in any atmosphere, preferably at about or below atmospheric pressure, which has no significant deleterious effect on the sample such as, for example, argon. Preferably, thermal decomposition is carried out in a partial vacuum to aid in removal of gases.

The resulting porous body is comprised of the layer or layers of coated fibrous material and infiltration-promoting material. The porous body has a structure and an open porosity which permit production of the present composite. Generally, the open porosity is distributed in or through the body. By open porosity it is meant herein pores, voids, or channels which are open to the surface of the body thereby making the interior surfaces accessible to the ambient atmosphere or the infiltrant. The particular amount of open porosity is determined empirically and depends largely on the particular final composite desired. Generally, the porous body has an open porosity ranging from about 25% by volume to about 80% by volume of the body. Frequently, the porous body has an open porosity ranging from about 35% by volume to about 75% by volume, or from about 40% by volume to about 50% by volume, of the body. Preferably, the open porosity enables the molten infiltrant to infiltrate by capillarity.

Preferably, the open porosity is comprised of small pores, preferably ranging from about 0.1 micron and about 50 microns, and preferably at least significantly or substantially uniformly distributed in or through the porous body thereby enabling the production of a composite wherein the matrix phase is at least significantly or substantially uniformly distributed in or through the composite.

Generally, the porous body has no closed porosity. By closed porosity it is meant herein closed pores or voids, i.e. pores not open to the surface of the body and therefore not in contact with the ambient atmosphere.

Void or pore content, i.e. both open and closed porosity, can be determined by standard physical and metallographic techniques.

In carrying out the present process, an infiltrant composition comprised of boron and silicon wherein boron generally ranges from about 0.1% by weight to about 10% by weight of silicon is provided. Generally, the infiltrant composition can be pre-reacted, i.e. have boron dissolved in the silicon forming the present infiltrant, any time prior to infiltration. Preferably, the composition is pre-reacted before assembly to carry out the infiltration.

The present infiltrant is comprised of boron and silicon wherein boron ranges generally from about 0.1% by weight to about 10% by weight, frequently from about 1% by weight to about 10% by weight, and preferably from about 1% by weight to about 3% by weight, of silicon. Boron ranging from about 0.1% by weight to about 1.6% by weight of silicon is in solution in silicon, and at about 1.6% by weight it forms a saturated solution. In excess of about 1.6% by weight of silicon, boron forms a compound therewith which precipitates as a finely dispersed solid. Amounts of boron in excess of about 10% by weight of silicon provide no advantage. When the infiltrant is molten, the precipitate usually is $SiB_6$. When the infiltrant is solid, the precipitate can be $SiB_3$, $SiB_6$, or a mixture thereof. The compounds of boron and silicon have no significant effect on the present process, i.e. they are substantially inert herein. Preferably, the infiltrant contains a saturated solution of boron in silicon and most preferably it is comprised of such a saturated solution.

The infiltrant can be formed in a known manner. For example, a solid particulate mixture of boron and silicon can be heated in an atmosphere non-oxidizing with respect to silicon to a temperature at which silicon is molten and boron will dissolve therein.

In a preferred embodiment of carrying out the present process, the porous body and the infiltrant or infiltrant composition are contacted with infiltrating means whereby the molten infiltrant is infiltrated into the body. The infiltrating means allows the present molten infiltrant to be infiltrated into the body. For example, an assembly is formed comprised of the porous body in contact with means that are in contact with the solid infiltrant and which enable infiltration of the infiltrant, when molten, into the porous body. In one infiltration technique, the porous body is placed on a woven cloth of elemental carbon, a piece of infiltrant is also placed on the cloth, and the resulting assembly is heated to infiltration temperature. At infiltration temperature, the molten infiltrant migrates along the cloth and wicks into the porous body. After infiltration, the wicking carbon cloth may be removed from the composite by diamond grinding.

In another technique, the infiltration procedure can be carried out as set forth in U.S. Pat. No. 4,626,516 which discloses an assembly that includes a mold with infiltration holes and a reservoir holding elemental silicon. A preform is placed within the mold and carbon wicks are provided in the infiltrating holes. The wicks are in contact with the preform and also with the silicon and at infiltration temperature the molten silicon migrates along the wicks into the preform.

U.S. Pat. No. 4,737,328 discloses another infiltration technique which comprises contacting a preform with a powder mixture composed of silicon and hexagonal boron nitride, heating the resulting structure to a temperature at which the silicon is fluid and infiltrating the fluid silicon into the preform. After infiltration, the hexagonal boron nitride powder is brushed off the composite.

The present assembly is heated to infiltration temperature in a nonoxidizing partial vacuum, particularly non-oxidizing with respect to the molten infiltrant, wherein the residual gases have no significantly deleterious effect on said assembly and the present infiltration is carried out in such nonoxidizing partial vacuum. Preferably, such nonoxidizing partial vacuum is provided before heating is initiated. The partial vacuum should be at least sufficient to avoid the entrapment of pockets of gas which would lead to excessive porosity, i.e. it should be sufficient to produce the present composite. Generally, such a partial vacuum ranges from about 0.01 torr to about 2 torr, and usually from about 0.01 torr to about 1 torr to insure removal of entrapped gas in the body being infiltrated.

Ordinarily and as a practical matter, the furnace used is a carbon furnace, i.e. a furnace fabricated from elemental carbon. Such a furnace acts as an oxygen getter for the atmosphere within the furnace reacting with oxygen to produce CO or $CO_2$ and thereby provides a nonoxidizing atmosphere, i.e. the residual gases have no significantly deleterious effect on the infiltrating infiltrant. The present infiltration cannot be carried out in air because the liquid silicon would oxidize and form a dense silica coating before any significant infusion by the infiltrant occurred. In such instance where a carbon furnace is not used, it is preferable to have an oxygen getter present in the furnace chamber, such as elemental carbon, in order to insure the maintenance of a nonoxidizing atmosphere. Alternatively, other nonoxidizing atmospheres which have no significant deleterious effect on the structure within the furnace can be used at partial vacuums of about $10^2$ torr to 2 torr.

The present infiltration is carried out at a temperature at which the infiltrant is molten and which has no significant deleterious effect on the porous body being infiltrated. The present infiltration temperature ranges from a temperature at which the infiltrant is molten to a temperature at which there is no significant vaporization of the infiltrant. Molten silicon has a low viscosity. The melting point of the silicon, and therefore the melting point of the present infiltrant, can vary depending largely on the particular impurities which may be present. Generally, the present infiltration temperature ranges from greater than about 1400° C. to about 1550° C., and preferably from about 1450° C. to about 1500° C. The rate of penetration of the infiltrant into the porous body depends on the wetting of the body by the infiltrant melt and the fluidity of the melt. With increase in temperature, the ability of the molten infiltrant to wet the porous body improves.

In the present process, sufficient infiltrant is infiltrated into the porous body to produce the present composite. The molten infiltrant is mobile and highly reactive. It has an affinity for silicon-wettable materials wetting them or wetting and reacting with them. It has a strong affinity for elemental carbon, wetting it and reacting with it to form silicon carbide. The molten infiltrant also has an affinity for any metal with which it reacts to form the silicide thereof. In addition, sufficient infiltrant is infiltrated into the porous body to fill pores or voids which may remain to produce the present composite.

The period of time required for infiltration by the infiltrant is determinable empirically and depends largely on the size of the porous body and extent of infiltration required. Generally, it is completed in less than about 20 minutes, and often in less than about 10 minutes.

The resulting infiltrated body is cooled in an atmosphere and at a rate which has no significant deleterious effect on it. Preferably, it is furnace cooled in the nonoxidizing partial vacuum to about room temperature, and the resulting composite is recovered.

In the present process, there is no loss, or no significant loss, of the boron nitride-coated fibrous material and infiltration-promoting material.

The present composite is comprised of boron nitride-coated fibrous material and a matrix phase. The matrix phase is distributed in or through the boron nitride-coated fibrous material and generally it is substantially completely space filling. Usually, the matrix phase is continuous and interconnecting. Generally, the matrix in the final composite has a thermal expansion coefficient ranging from lower than that of the boron nitride coated fibrous material to less than about 15% higher than that of the boron nitride coated fibrous material. The production of such a composite can be determined empirically. More preferably, for optimum mechanical properties of the composite, the matrix has a thermal expansion coefficient ranging from less than to about the same as that of the boron nitride coated fibrous material.

Generally, the matrix is in direct contact with more than 70% of the surface area of the boron nitride coated fibrous material. Frequently, the matrix coats or envelops each coated fiber, filament, strand, bundle or whisker of the boron nitride coated fibrous material sufficiently to be in direct contact with more than 80%, preferably more than 90%, more preferably more than 99%, of the surface area of the boron nitride coated fibrous material in the composite. Most preferably, the boron nitride-coated fibrous material is substantially or totally enveloped by the matrix phase.

Generally, the boron nitride coated fibrous material ranges from about 10% to about 70%, frequently from about 20% to about 60%, or from about 30% to about 50%, by volume of the composite.

The boron nitride coating on the fibrous material in the composite is detectable by scanning electron microscopy and generally ranges in thickness from about 0.5 microns to about 1.5 microns. The particular amount of boron nitride in the composite provided by the boron nitride coating depends largely on the amount of coated fibrous material present, the thickness of the boron nitride coating and the diameter of the fiber, filament, or whisker. Therefore, the volume fraction of boron nitride provided by the coating is the balance of the volume fraction of all other components of the composite. Frequently, however, the boron nitride coating on the fibrous material in the composite generally ranges from less than about 1% by volume to about 20% by volume, or from about 1% by volume to about 10% by volume, or from about 1% by volume to about 5% by volume, of the total volume of boron nitride coated fibrous material. The boron nitride coating can be amorphous crystalline or a combination thereof.

Generally, the boron nitride coating optimizes interfacial shear stress between the fibrous material and matrix resulting in a composite with a toughness significantly higher than that of a composite wherein the fibrous material is not coated with boron nitride.

Generally, there is no significant amount of reaction product formed, and preferably no reaction product detectable by scanning electron microscopy, directly between the matrix and the fibrous material coated with boron nitride.

The matrix comprises at least about 30% by volume of the composite. The composition of the matrix can vary and depends largely on the composition of the infiltration-promoting material and any silicon-wettable coating. Preferably, at least about 70% or at least 90%, or at least 95%, or more than 99%, by volume of the matrix is crystalline. Most preferably, the matrix is crystalline. In one embodiment, the polycrystalline portion of the matrix has an average grain size of less than about 100 microns, or less than about 50 microns, or less than about 20 microns, and most preferably less than about 10 microns. In another embodiment, part of the matrix is comprised of crystalline whiskers ranging up to about 50% by volume of the matrix. Preferably, the whiskers are comprised of silicon carbide, silicon nitride, and mixtures thereof.

In one embodiment, the matrix is a ceramic selected from the group consisting of metal carbide, metal nitride, metal silicide and mixtures thereof.

Preferably the metal carbide in the matrix is selected from the group consisting of boron carbide, molybdenum carbide, niobium carbide, silicon carbide, titanium carbide and mixtures thereof. Silicon carbide is most preferred. Silicon carbide phase formed in situ may contain boron.

Preferably, the metal nitride in the matrix is selected from the group consisting of aluminum nitride, niobium nitride, silicon nitride, titanium nitride, zirconium nitride and mixtures thereof.

Preferably, the metal silicide in the matrix is selected from the group consisting of chromium silicide, molybdenum silicide, tantalum silicide, titanium silicide, tungsten silicide, zirconium silicide, and mixtures thereof. Metal silicide phase formed in situ may contain boron.

Generally, the matrix contains a phase comprised of a solution of boron and elemental silicon in at least a detectable amount, i.e. an amount detectable by microprobe analysis or Auger electron spectroscopy. In one embodiment, the phase comprised of a solution of boron and silicon ranges from a detectable amount to about 50% by volume of the matrix. In another embodiment, the phase comprised of a solution of boron and silicon is present in an amount of at least about 1% by volume, or ranges from about 1% to about 25% by volume, or from about 1% by volume to about 5% by volume, or to about 2% by volume, of the matrix. In the solution phase, boron ranges from about 0.1% by weight to about 1.6% by weight of silicon. Generally, this phase is distributed in the composite, and preferably, it is distributed through the composite significantly uniformly.

The present composite may contain a phase of a compound of boron and silicon usually selected from the group consisting of $SiB_3$, $SiB_6$, and a mixture thereof which generally is distributed through the composite.

The compound of boron and silicon usually ranges from an amount detectable by microprobe analysis up to about 30% by volume, or up to about 5% by volume, or up to about 1% by volume, of the matrix.

The matrix may contain a phase of a metal which forms a silicide but which had not reacted with the infiltrant. In such instance, it would be encapsulated by a metal silicide phase and/or a boron-containing metal silicide phase. Generally, such metal may range from an amount detectable by microprobe analysis, or from about 0.5% by volume to about 10% by volume, of the matrix.

The matrix of the present composite may contain a phase of elemental carbon which had not completely reacted with the infiltrating silicon. In such instance, the carbon would be totally encapsulated by a phase of silicon carbide and/or boron-containing silicon carbide formed in situ. Generally, this elemental carbon may range from an amount detectable by microprobe analysis, or from about 0.5% by volume, to about 10% by volume, of the composite.

In one embodiment, the present composite is comprised of matrix containing a layer of boron nitride coated fibrous material.

In another embodiment, the present composite is comprised of matrix containing a plurality of layers of boron nitride coated fibrous material. Preferably, the fibrous layers are substantially parallel to each other and separated from each other by matrix. Preferably, the matrix is distributed in each layer of fibrous material generally significantly or substantially uniformly.

In another embodiment, the composite is comprised of matrix containing a plurality of layers of boron nitride coated filaments which preferably are substantially parallel to each other and are separated from each other by matrix. In each layer, preferably more than 95% by volume, or more than 99% by volume, of the coated filaments, and preferably all or substantially all of the coated filaments, are spaced from each other and parallel or at least substantially parallel, to each other. Preferably, more than 95% by volume, or more than 99% by volume, or substantially all, of the coated filaments in each layer are aligned, or Substantially aligned, in a single plane. Any misalignment of the coated filaments should not significantly degrade the mechanical properties of the composite. Also, preferably more than 95% or more than 99%, or substantially all, of the surface area of the coated filaments is in direct contract with the matrix. Also, crystalline whiskers may be present up to about 50% by volume of the matrix.

The boron nitride coating optimizes interfacial shear stress between the fibrous material and matrix resulting in a composite with a toughness significantly or substantially higher than that of a composite wherein the fibrous material is uncoated. Specifically, if the matrix and fibrous material, for example filaments, were in direct contact, even a slight reaction therebetween would increase interfacial bonding thereby requiring a higher stress to pull out the filaments making the composite less tough. If the interfacial bonding were too high, then the composite would fail in a brittle manner. In contrast, the present boron nitride coating provides an interfacial shear stress which is significantly lower than that produced with uncoated filaments thereby allowing the coated filaments to pull out more easily and give the composite more toughness. The coated filaments prevent brittle fracture of the composite at room temperature. By brittle fracture of a composite it is meant herein that the entire composite cracks apart at the plane of fracture. In contrast to a brittle fracture, the present composite exhibits fibrous material or filament pull-out on fracture at room temperature.

One particular advantage of this invention is that the present composite can be produced directly in a wide range of sizes. For example, it can be as long or as thick as desired.

Also, since the tape, sheet or laminated structure used to produce the present composite frequently is flexible, or may be made flexible by application of heat thereto, the present composite can be comprised of a variety of shapes such as tape, sheet, bent tape, bent sheet or any combination hereof. Therefore, the present composite can be of a form which is simple, complex, hollow or any combination thereof.

The present composite has a porosity of less than about 20%, preferably less than about 10%, or less than about 5%, more preferably less than about $i^b$ by volume of the composite. Most preferably, the composite is void- or pore-free, or has no significant porosity, or has no porosity detectable by scanning electron microscopy. Preferably, any voids or pores in the composite are less than about 70 microns, more preferably less than about 50 microns or less than about 10 microns, and generally they are distributed in the composite.

The present composite has a wide range of applications depending largely on its particular composition. For example, it is useful as a wear resistant part, acoustical part or high-temperature structural component.

The invention is further illustrated by the following examples where, unless otherwise stated, the procedure was as follows:

The infiltrant was produced by forming a mixture of boron and silicon powders wherein boron was present in an amount of about 3% by weight of silicon. The mixture was heated in a vacuum non-oxidizing with respect to silicon to about 1450° C. and boron dissolved in the molten silicon forming a saturated solution as well as a finely divided precipitate of a compound of boron and silicon. The melt was then cooled to room temperature in the same vacuum. The resulting solid was then broken into small chunks.

Commercially available continuous filaments of silicon carbide produced by a chemical vapor deposition process and sold under the trademark AVCO SCS-6 were used. These filaments had a 35 micron carbon core on which silicon carbide was deposited to an overall diameter of about 145 microns. The outside surface of the filaments consisted of two layers of pyrolyric carbon and carbon-silicon, with an overall thickness of about 3 microns. In air at room temperature these filaments have a tensile strength of about 500 thousand psi and a tensile modulus of about 60 million psi. These filaments have an average thermal expansion coefficient of less than about $5.0 \times 10^{-6}$ in/in−°C.

The filaments were cut to a length typically of about 1.75 inches and were coated with boron nitride by the following low pressure chemical vapor deposition process utilizing the reaction $B_3N_3H_3Cl_3 \rightarrow 3BN + 3HCl$. Specifically, the filaments were placed on a molybdenum screen which was then positioned at about the midpoint of the hot zone of a pyrex/quartz/pyrex furnace tube. A 1.00 gram sample of commercial trichloroborazine ($B_3N_3H_3Cl_3$) was transferred in an argon-filled glove box to a pyrex end-section which contained a thermocouple vacuum gauge, a cold trap and a vacuum stopcock. The closed pyrex end-section was then taken out of the glove box and attached to an end of the furnace tube and to a vacuum system. The end-section containing the trichloroborazine was then cooled using liquid nitrogen and the furnace tube was opened to the vacuum system via the stopcock of the pyrex end-section. After the system reached a pressure lower than 0.020 torr, the furnace was heated to about 1050° C. When the pressure had again dropped below 0.020 torr and the furnace temperature had stabilized, the end-section containing the trichloroborazine was warmed by an oil bath maintained at 60° C., whereupon the solid began to vaporize, depositing BN and liberating gaseous HCl in the hot zone of the furnace tube and producing an increase in pressure. The pressure was observed to reach as high as about 200 torr before stabilizing at about 50 torr. After two hours, the pressure was found to have decreased to about 0.020 torr, whereupon the furnace was shut down and the system allowed to cool to room temperature before opening the tube and removing the sample. Identification of the chemically vapor deposited layer as BN was accomplished by means of electrical resistance measurement and a quantitative ESCA analysis of a film deposited in substantially the same manner on a SiC disk surface. This film was amorphous to x-rays in the as-deposited condition and appeared fully dense and smooth at high magnification in the SEM. Scanning electron microscopy observation of the ends of coated and broken filaments revealed that the coating was continuous and smooth and about one micron thick on the filaments and left no significant portion of the filaments exposed.

The boron nitride coated filaments were uniaxially aligned by placing them in a device for aligning filaments and maintaining the required spacing between them. This device was made from a copper foil laminated on a printed circuit board which was etched by the photolithographic technique in such a way as to produce parallel grooves about 0.006 inch diameter, 0.004 inch deep, and 0.008 inch apart (center-to-center). The coated filaments were placed on this device and a simple scoop of the filaments using a straight edge led to filling of each of the grooves with a filament. This resulted in a single layer of uniformly spaced coated filaments which was lifted off the board by putting adhesive tapes across each end portion of the filament layer. The adhesive tapes were sufficient to maintain the alignment and spacing between the coated filaments in the layer. Several such pre-formed layers of coated filaments were produced in which the coated filaments were substantially parallel and spaced about 100 microns from each other.

The silicon carbide powder had an average surface area of about 5 m$^2$/g.

The crushed carbon felt was comprised of chopped fibers sufficiently small to form a slurry.

By ambient temperature herein it is meant room temperature, i.e. from about 15° C. to about 30° C.

The organic binding material was comprised of commercially available organic binder comprised of polyvinylbutyral (average molecular weight of about 32,000) and commercially available liquid plasticizer comprised of poiyunsaturated hydroxylated low-molecular weight organic polymers.

Standard techniques were used to characterize the hot pressed composite for density, microstructure and mechanical properties.

EXAMPLE 1

72 grams of a crushed carbon felt and 48 grams of silicon carbide powder were dry mixed with 1.5 grams of organic binder. To this, 70 grams of a mixture consisting of toluene and methyl isobutyl ketone in the ratio 3:1 was added. This mixture was mixed for 5 minutes in a paint shaker. Then, 4.5 grams of the organic binder and 4.5 grams of liquid plasticizer was added to the mixture. To this, 0.1 gram of a commercially available organic silicone oil (which can be considered a part of the organic binding material) was added. This mixture was ball milled for about 30 minutes at room temperature to form a slurry. The slurry was then deaired in a vacuum. The resulting slurry was tape cast on a Mylar sheet using a doctor blade, the cast tape was then dried in air at room temperature and atmospheric pressure to remove the solvent, and the resulting tape was stripped from the Mylar sheet.

The tape was about 6 inches wide and had a substantially uniform thickness of about 0.009 inch.

The tape was cut to produce a number of tapes having the length and width of the aligned layer of filaments, i.e. the untaped portion of the aligned layer of filaments.

A layered sandwich-type structure was formed comprised of seven layers of tape and six layers of filaments wherein the filament layers were separated from each other by tape. The adhesive-taped portions of the filaments protruded from the layered structure. Before assembly, to enhance adherence, the faces of the tapes which were to be contacted with the filaments were sprayed with an organic solution of binder, and dried for a few seconds in air at room temperature leaving a coating of sticky organic binder. Specifically, a solution comprised of 3 weight % of commercially available polyvinylbutyral (average molecular weight of about 32,000), 39 weight % toluene, 9.5 weight % acetone, 39 weight % xylene and 9.5 weight % ethanol was used. The solution was sprayed on the faces of the tapes for a sufficient time so that upon evaporation of the solvent there remained about 0.2 milligrams of sticky organic binder per square centimeter of surface.

The resulting layered structure was laminated in air in a laminating press at about 200° C. under a pressure of about 1000 psi for about one minute. At lamination temperature and pressure, the tapes were plastic resulting in filling of the void spaces between and around the filaments.

The laminated structure was sliced perpendicular to the filament axis into a bar-shaped sample (1.25 inch × 0.3 inch × 0.15 inch) using a diamond saw. Examination of a cross-section showed uniform spacing between the filaments as well as between the layers of filaments.

The sample was placed in a vacuum oven for removing the organic binding material wherein the vacuum was typically about 20 millitorr. The burn-out cycle was comprised of heating the furnace at a rate of 30° C. per hour to 500° C., a five-hour hold at 500° C. and a cool-down to room temperature at a rate of 200° C. per hour. This led to complete removal of the organic binding material from the laminated structure which resulted in a porous body comprised of the boron nitride coated filaments and matrix-forming material. From other work, it was known that the porous body had an open porosity of about 50% by volume.

The porous body and solid pieces of infiltrant were placed on a woven carbon fabric which was contained in a BN-sprayed graphite tray. This tray was then placed in a carbon resistance heated bell jar furnace and slowly heated at a rate of about 10° C. per minute to about 400° C. in a vacuum of about 0.05 torr. Subsequent to this, the porous body was rapidly heated to 1420° C. at which point the infiltrant was molten and reacted with the carbon cloth and got wicked into the porous body. A considerable amount of heat which was detected by a thermocouple placed on top of the porous body was generated due to the exothermic reaction of infiltrant with the crushed carbon felt in the porous body. The sample was held for 5 minutes under these conditions and then slowly cooled to below the melting point of the infiltrant after which the furnace power was turned off and the infiltrated sample was cooled to room temperature in the vacuum of the bell jar.

The resulting composite was broken at room temperature in a three-point-bend configuration to determine fracture strength and load-elongation characteristics. It exhibited filament pullout and did not break at the plane of fracture.

FIG. 1 shows a load deflection curve for this composite. It can be seen that this composite showed toughened ceramic-like behavior. The load-deflection curve shows that after the onset of matrix cracking, the load carrying capability of the composite was maintained for a while reaching an ultimate strength of 72,500 psi (500 MPa) beyond which the composite showed substantial but not complete failure. This composite would be useful as a structural or wear-resistant part.

A polished cross-section (perpendicular to filament axis) of the composite was examined. It showed uniform spacing between the filaments. It also showed that each Layer of filaments was maintained in a substantially single plane. In addition, it showed a fully dense matrix surrounding each individual boron nitride coated filament and in direct contact therewith. No porosity was detected by microscopy.

It was estimated that, based on the volume of the composite, this composite was comprised of about 65% by volume of silicon carbide phase some of which may be boron-containing silicon carbide phase, about 15% by volume of a phase comprised of a solution of elemental boron and elemental silicon which contains boron in an amount of about 1.6% by weight of silicon, a minor amount of a compound of boron and silicon, and about 20% by volume of boron nitride coated filaments.

From other work, it was known that the average thermal expansion coefficient of the matrix was lower than that of the boron nitride coated filaments.

EXAMPLE 2

This example was carried out in substantially the same manner as Example 1, except that no filaments were used.

A sample of the resulting monolithic body was broken. Its load deflection curve is also shown in FIG. 1. It fractured in a brittle manner at 22,000 psi (150 MPa).

What is claimed and sought to be protected by Letters Patent of the United States is as follows:

1. A process for producing a composite containing at least about 10% by volume of boron nitride coated fibrous material and having a porosity of less than about 20% by volume which comprises the following steps:

(a) forming tapes comprised of a mixture of infiltration-promoting material and organic binding material;
(b) depositing a coating of boron nitride on fibrous material leaving no significant portion thereof exposed;
(c) depositing a silicon-wettable coating on said boron nitride-coated fibrous material leaving no significant portion of said boron nitride exposed;
(d) disposing a layer of the resulting coated fibrous material between the faces of two of said tapes forming a layered structure;
(e) laminating the layered structure to form a laminated structure;
(f) heating said laminated structure to remove said organic binding material leaving no significant deleterious residue producing a porous body;
(g) infiltrating a molten infiltrant comprised of boron and silicon into said porous body to produce an infiltrated product, said molten infiltrant containing boron in solution in an amount ranging from about 0.1% by weight of silicon to an amount which forms a saturated solution with silicon; and
(h) cooling said infiltrated product producing said composite.

2. The process according to claim 1, wherein said composite contains at least about 20% by volume of boron nitride coated fibrous material and has a porosity of less than about 10% by volume 3. The process according to claim 1, wherein said infiltration-promoting material in step (a) is selected from the group consisting of a powder, a fibrous material and mixtures thereof.

4. The process according to claim 1, wherein said infiltration-promoting material in step (a) is comprised of a mixture of fibrous material and powder wherein the powder ranges from about 1% to about 50% by weight of the infiltration-promoting material.

5. The process according to claim 1, wherein said infiltration-promoting material in step (a) is comprised of a mixture of fibrous material of elemental carbon and silicon carbide powder, and the silicon carbide powder ranges from about 10% to about 40% by weight of the infiltration-promoting material.

6. The process according to claim 1, wherein said infiltration-promoting material in step (a) is selected from the group consisting of elemental carbon, a metal carbide, a metal which reacts with silicon to form a silicide, a metal nitride, a metal silicide and mixtures thereof.

7. The process according to claim 1, wherein said fibrous material in step (b) is selected from the group consisting of fibers, filaments, strands, bundles, whiskers, cloth, felt, and mixtures thereof.

8. The process according to claim 1, wherein said fibrous material in step (b) is selected from the group consisting of aluminum oxide, mullite, a carbon-containing material, elemental carbon, a SiC-containing material, silicon carbide, a silicon nitride-containing material, silicon nitride, silica, and mixtures thereof.

9. The process according to claim 1, wherein said fibrous material in step (b) is a carbon-containing material.

10. The process according to claim 1, wherein said fibrous material in step (b) is a silicon carbide-containing material.

11. The process according to claim 1, wherein said silicon-wettable coating in step (c) is selected from the group consisting of elemental carbon, metal carbide, a metal which reacts with silicon to form a silicide thereof, a metal nitride, a metal silicide, and mixtures thereof.

12. The process according to claim 1, wherein in step (d) a plurality of layers of said coated fibrous material and more than two tapes are used in forming the layered structure and wherein all of the layers of coated fibrous material are separated from each other by tape.

13. The process according to claim 1, wherein in step (d) the layer of coated fibrous material is comprised of a plurality of continuous spaced filaments.

14. The process according to claim 1, wherein in step (g) said infiltrant is comprised of boron and silicon wherein boron ranges from about 1% by weight to about 3% by weight of silicon containing boron in solution in said silicon ranging from about 1% by weight of silicon to an amount which forms a saturated solution with silicon.

15. The process according to claim 1, wherein in step (g) said infiltrant is comprised of a saturated solution of boron in silicon.

16. A process for producing a composite containing at least about 10% by volume of boron nitride coated fibrous material and having a porosity of less than about 10% by volume which comprises the following steps:
(a) forming tapes comprised of a mixture of infiltration-promoting material and organic binding material;
(b) depositing a coating of boron nitride on fibrous material leaving no significant portion thereof exposed;
(c) depositing a silicon-wettable coating on said boron nitride-coated fibrous material leaving no significant portion of said boron nitride exposed;
(d) disposing a layer of the resulting coated fibrous material between the faces of two of said tapes forming a layered structure;
(e) laminating the layered structure to form a laminated structure;
(f) heating said laminated structure to remove said organic binding material leaving no significant deleterious residue producing a porous body;
(g) providing an infiltrant composition comprised of boron and silicon;
(h) contacting said porous body and said infiltrant composition;
(i) heating the resulting assembly in a partial vacuum to a temperature at which said infiltrant composition is molten whereby molten infiltrant containing boron in solution in silicon in an amount ranging from about 0.1% by weight of silicon to a saturated solution of boron in silicon is infiltrated into said porous body; and
(j) cooling said infiltrated product producing said composite.

17. The process according to claim 16, wherein said infiltration-promoting material in step (a) is comprised of a mixture of fibrous material of elemental carbon and silicon carbide powder, and the silicon carbide powder ranges from about 10% to about 40% by weight of the infiltration-promoting material.

18. The process according to claim 16, wherein said fibrous material in step (b) is selected from the group consisting of aluminum oxide, mullite, a carbon-containing material, elemental carbon, a SiC-containing material, silicon carbide, a silicon nitride-containing material, silicon nitride, silica, and mixtures thereof.

19. The process according to claim 16, wherein in step (d) a plurality of layers of said coated fibrous material and more than two tapes are used in forming the layered structure and wherein all of the layers of coated fibrous material are separated from each other by tape.

20. The process according to claim 16, wherein in seep (d) the layer of coated fibrous material is comprised of a plurality of continuous spaced filaments.

21. The process according to claim 16, wherein in step (g) said infiltrant composition is comprised of boron and silicon wherein boron ranges from about 1% by weight to about 3% by weight of silicon containing boron in solution in said silicon ranging from about 1% by weight of silicon to an amount which forms a saturated solution with silicon.

22. The process according to claim 16, wherein in step (i) said molten infiltrant is comprised of a saturated solution of boron in silicon.

23. A process for producing a composite containing at least about 10% by volume of boron nitride coated filaments and having a porosity of less than about 10% by volume which comprises the following steps:
   (a) forming tapes comprised of a mixture of infiltration-promoting material and organic binding material;
   (b) depositing a coating of boron nitride on filaments leaving no significant portion thereof exposed, each said filament having a diameter of at least about 50 microns and a length of at least about 10 times its diameter;
   (c) disposing a layer of said coated filaments between the faces of two of said tapes forming a layered structure, said filaments in said layer being spaced from each other;
   (d) laminating the layered structure to form a laminated structure;
   (e) heating said laminated structure to remove said organic binding material leaving no significant deleterious residue producing a porous body;
   (f) infiltrating a molten infiltrant comprised of boron and silicon into said porous body to produce an infiltrated product, said molten infiltrant containing boron in solution in an amount ranging from about 0.1% by weight of silicon an amount which forms a saturated solution with silicon; and
   (g) cooling said infiltrated product producing said composite.

24. The process according to claim 23, wherein said infiltration-promoting material in step (a) is selected from the group consisting of a powder, a fibrous material and mixtures thereof.

25. The process according to claim 23, wherein said infiltration-promoting material in step (a) is comprised of a mixture of fibrous material of elemental carbon and silicon carbide powder, and the silicon carbide powder ranges from about 10% to about 40% by weight of the infiltration-promoting material.

26. The process according to claim 23, wherein said filaments in step (b) are selected from the group consisting of aluminum oxide, mullite, a carbon-containing material, elemental carbon, a SiC-containing material, silicon carbide, a silicon nitride-containing material, silicon nitride, silica, and mixtures thereof.

27. The process according to claim 23, wherein in seep (c) a plurality of layers of said coated filaments and more than two tapes are used in forming the layered structure and wherein all of the layers of coated filaments are separated from each other by tape.

28. The process according to claim 23, wherein in step (f) said infiltrant is comprised of boron and silicon wherein boron ranges from about 1% by weight to about 3% by weight of silicon containing boron in solution in said silicon ranging from about 1% by weight of silicon to an amount which forms a saturated solution with silicon.

29. The process according to claim 23, wherein in step (f) said infiltrant is comprised of a saturated solution of boron in silicon.

30. A process for producing a composite containing at least about 10% by volume of boron nitride coated fibrous material and having a porosity of less than about 10% by volume which comprises the following steps:
   (a) forming tapes comprised of a mixture of infiltration-promoting material and organic binding material;
   (b) depositing a coating of boron nitride on filaments leaving no significant portion thereof exposed, each said filament having a diameter of at least about 50 microns and a length of at least about 10 times its diameter;
   (c) disposing a layer of said coated filaments between the faces of two of said tapes forming a layered structure, said filaments in said layer being spaced from each other;
   (d) laminating the layered structure to form a laminated structure;
   (e) heating said laminated structure to remove said organic binding material leaving no significant deleterious residue producing a porous body;
   (f) providing an infiltrant comprised of boron and silicon containing elemental boron in solution in an amount ranging from about 0.1% by weight of elemental silicon to an amount which forms a saturated solution with silicon;
   (g) contacting said porous body and said infiltrant with infiltrating means whereby molten infiltrant is infiltrated into said porous body;
   (h) heating the resulting assembly in a partial vacuum to a temperature at which said infiltrant is molten and infiltrating said molten infiltrant into said porous body to produce an infiltrated product; and
   (i) cooling said infiltrated product producing said composite.

31. The process according to claim 30, wherein said infiltration-promoting material in step (a) is comprised of a mixture of fibrous material of elemental carbon and silicon carbide powder, and the silicon carbide powder ranges from about 10% to about 40% by weight of the infiltration-promoting material.

32. The process according to claim 30, wherein in step (c) a plurality of layers of said coated filaments and more than two tapes are used in forming the layered structure and wherein all of the layers of coated filaments are separated from each other by tape.

33. The process according to claim 30, wherein in step (f) said infiltrant is comprised of boron and silicon wherein boron ranges from about 1% by weight to about 3% by weight of silicon containing boron in solution in said silicon ranging from about 1% by weight of silicon to an amount which forms a saturated solution with silicon.

34. The process according to claim 30, wherein in step (f) said infiltrant is comprised of a saturated solution of boron in silicon.

* * * * *